United States Patent
Lane et al.

(10) Patent No.: US 10,962,703 B1
(45) Date of Patent: Mar. 30, 2021

(54) NANOPARTICLE DISPERSION FOR INCREASING OPTICAL INDEX OF REFRACTION

(71) Applicant: Facebook Technologies, LLC, Menlo Park, CA (US)

(72) Inventors: Austin Lane, Redmond, WA (US); Matthew E. Colburn, Woodinville, WA (US); Giuseppe Calafiore, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 184 days.

(21) Appl. No.: 16/157,462

(22) Filed: Oct. 11, 2018

Related U.S. Application Data

(60) Provisional application No. 62/571,693, filed on Oct. 12, 2017.

(51) Int. Cl.
*G02B 5/18* (2006.01)
*G02B 27/01* (2006.01)
*F21V 8/00* (2006.01)

(52) U.S. Cl.
CPC ......... *G02B 6/0065* (2013.01); *G02B 5/1842* (2013.01); *G02B 6/0016* (2013.01); *G02B 6/0038* (2013.01); *G02B 27/0172* (2013.01)

(58) Field of Classification Search
CPC ...... G02B 1/11; G02B 5/3033; G02B 5/3083; G02B 1/04; G02B 5/22; G02B 1/111; G02B 1/12; G02B 5/201; G02B 5/208; G02B 5/28; G02B 6/0046; G02B 1/02; G02B 1/041; G02B 1/113; G02B 1/118; G02B 1/14; G02B 1/18; G02B 2207/107; G02B 26/008; G02B 3/0006; G02B 5/0242; G02B 5/0808; G02B 1/105; G02B 2027/0178; G02B 27/0172; G02B 3/0031; G02B 3/0043; G02B 5/045; G02B 5/1819; H01L 2924/00014; H01L 2224/48091; H01L 2224/45139; H01L 2924/181; H01L 2224/0555; H01L 2224/0556; H01L 2224/05599; H01L 2924/00011; H01L 2924/00012; H01L 33/56; H01L 2224/48247; H01L 2224/48257; H01L 2224/73265; H01L 2224/8592;

(Continued)

(56) References Cited

U.S. PATENT DOCUMENTS 5,580,697 A 12/1996 Keana et al.
6,692,893 B2 2/2004 Ohsawa et al.

(Continued)

OTHER PUBLICATIONS

Chen, M. et al., "Light-controlled radical polymerization: Mechanisms, methods, and application," Chemistry Review, 2016, vol. 116, No. 17, pp. 10167-10211.

(Continued)

*Primary Examiner* — Brandi N Thomas
(74) *Attorney, Agent, or Firm* — Fenwick & West LLP

(57) ABSTRACT

Provided herein are compositions comprising functionalized gallium-based semiconductor nanoparticles for use in nanoprint resins and high-index overcoat materials. Also provided are methods of manufacturing functionalized gallium-based semiconductor nanoparticles and nanoprint resins and high-index overcoat materials using gallium-based semiconductor nanoparticles.

18 Claims, 7 Drawing Sheets

(58) Field of Classification Search
CPC ..... H01L 2933/0091; H01L 2224/0554; H01L 2224/05568; H01L 2224/05573; H01L 2224/13; H01L 2251/5369; H01L 31/0543; H01L 33/501; H01L 51/0096; H01L 2924/0002; H01L 31/02327; H01L 33/20; H01L 33/58; H01L 51/0047; H01L 51/0078; H01L 51/447; H01L 51/5275; H01L 51/56; H01L 21/30; H01L 2251/30; H01L 2251/5338; H01L 2251/558; H01L 27/142; H01L 27/156; H01L 27/32; H01L 27/323; H01L 27/3281; H01L 2924/00; H01L 31/02168; H01L 31/0232; H01L 31/028; H01L 31/0304; H01L 31/03044; H01L 31/0328; H01L 31/0352; H01L 31/035281; H01L 31/0392; H01L 31/03921; H01L 31/03923; H01L 31/03925; H01L 31/0475; H01L 31/05; H01L 31/0504; H01L 31/0508; H01L 31/0512; H01L 31/054; H01L 31/0547; H01L 31/068; H01L 31/18; H01L 31/1884; H01L 31/204; H01L 33/00; H01L 33/0075; H01L 33/06; H01L 33/08; H01L 33/22; H01L 33/30; H01L 33/32; H01L 33/34; H01L 33/54; H01L 33/60; H01L 33/62; H01L 51/0014; H01L 51/0036; H01L 51/0037; H01L 51/0046; H01L 51/0097; H01L 51/42; H01L 51/4253; H01L 51/426; H01L 51/4266; H01L 51/50; H01L 51/5036; H01L 51/52; H01L 51/5203; H01L 51/5206; H01L 51/5246; H01L 51/5253; H01L 51/5265; H01L 51/5271

USPC .......................... 359/290–292, 296, 298, 630

See application file for complete search history.

(56) References Cited

U.S. PATENT DOCUMENTS

| | | | |
|---|---|---|---|
| 7,575,851 | B2 | 8/2009 | Shiba et al. |
| 7,851,115 | B2 | 12/2010 | Wu |
| 2006/0194063 | A1 | 8/2006 | Murai et al. |
| 2006/0234269 | A1 | 10/2006 | Asplund et al. |
| 2009/0012203 | A1 | 1/2009 | Nakanishi et al. |
| 2009/0099282 | A1 | 4/2009 | Muller et al. |
| 2009/0123642 | A1 | 5/2009 | Sato |
| 2011/0084250 | A1* | 4/2011 | Jang ....................... H05B 33/14 257/14 |
| 2011/0226995 | A1 | 9/2011 | Tulsky et al. |
| 2015/0268771 | A1* | 9/2015 | Ookawa .................. G06F 3/044 345/174 |
| 2017/0084874 | A1* | 3/2017 | Baker ................. H01L 51/0096 |

OTHER PUBLICATIONS

Francis, R. et al., "Polymer grafter inorganic nanoparticles, preparation, properties, and applications: a review," Polymer Reviews, 2014, vol. 54, No. 2, pp. 268-347.

\* cited by examiner

NANOPARTICLE DISPERSION FOR INCREASING OPTICAL INDEX OF REFRACTION

CROSS REFERENCE TO RELATED APPLICATION

This application claims the benefit of U.S. Provisional Patent Application No. 62/571,693, filed Oct. 12, 2017, the disclosure of which is incorporated by reference in its entirety for all purposes.

BACKGROUND

The present disclosure generally relates to manufacturing of optical components, and specifically to using nanoparticle dispersion to increase an optical index of refraction.

Different forms of optical components (e.g., waveguides, diffraction gratings, etc.) often benefit from having a high index of refraction. However, materials with naturally high indices of refraction often have downsides (e.g., difficult to shape, reactive, expensive, etc.). Accordingly, conventional manufacturing processes are somewhat limited in producing high index optical components.

SUMMARY

In one aspect, provided herein is a blended material comprising: a substrate composed of a first material that is doped with nanoparticles of Gallium based semiconductors, and the first material has a first refractive index that is lower than a second refractive index of the nanoparticles, wherein the substrate is substantially transparent over at least a first band of light.

In some embodiment, the nanoparticles of Gallium based semiconductors are selected from a group consisting of Gallium Phosphide, Gallium Sulfide, and Gallium Nitride. In one embodiment, the nanoparticles of Gallium based semiconductor include respective surface that comprises a first ligand comprising a functional group, wherein the first ligand is covalently coupled to the surface. In another embodiment, the functional group is selected from a group consisting of: hydroxyl (—OH), carbonyl (—CO—), carboxyl (—COOH), amino (—NH$_2$), thiol (—SH), phosphate (PO$_4^{-3}$), acrylate, epoxy, azide (—N$_3$), alkene (—C═C—), alkyne (—CCH), or halogen (—Br, —F, —I, —Cl) functional group. In another embodiment, the first ligand is 11-(2-Bromoisobutyrate)-undecyl-1-phosphonate or 11-(2-Bromoisobutyrate)-undecyl-1-monophosphonate.

In some embodiment, the nanoparticles of Gallium based semiconductor further comprise a second ligand coupled to the functional group. In one embodiment, the second ligand is a small molecule, a monomer, or a polymer. In one embodiments, the second ligand is at least one butyl acrylate monomer.

In some embodiments, the substrate is a waveguide body and the nanoparticles have a distribution within the waveguide body such that the waveguide body has an effective refractive index between the first refractive index and the second refractive index. In some embodiments, nanoparticles have a periodic distribution within a portion of the substrate, and the portion of the substrate is a diffraction grating. In one embodiment, the second refractive index is at least 3 for the first band of light, and the first band of light is a visible band.

In some embodiment, the substrate is a polymer film. In some embodiments, the substrate is a resin comprising a crosslinking agent, a catalyst, and at least one monomer comprising at least one functional group, wherein the least one functional group is selected from the group consisting of: acrylate, epoxy, vinyl ether, thiol, or alkene, or a combination thereof.

In some embodiments, the first band of light is a visible band of light. In another embodiment, the first band of light also includes a portion of an infrared band of light. In some embodiments, the blended material is used to form an optical component. In one embodiment, the optical component is selected from a group consisting of: an optical film, a diffraction grating, a waveguide, a Fresnel lens, a positive lens, and a negative lens. In one embodiment, the optical component is part of a near-eye display.

Figure 1:
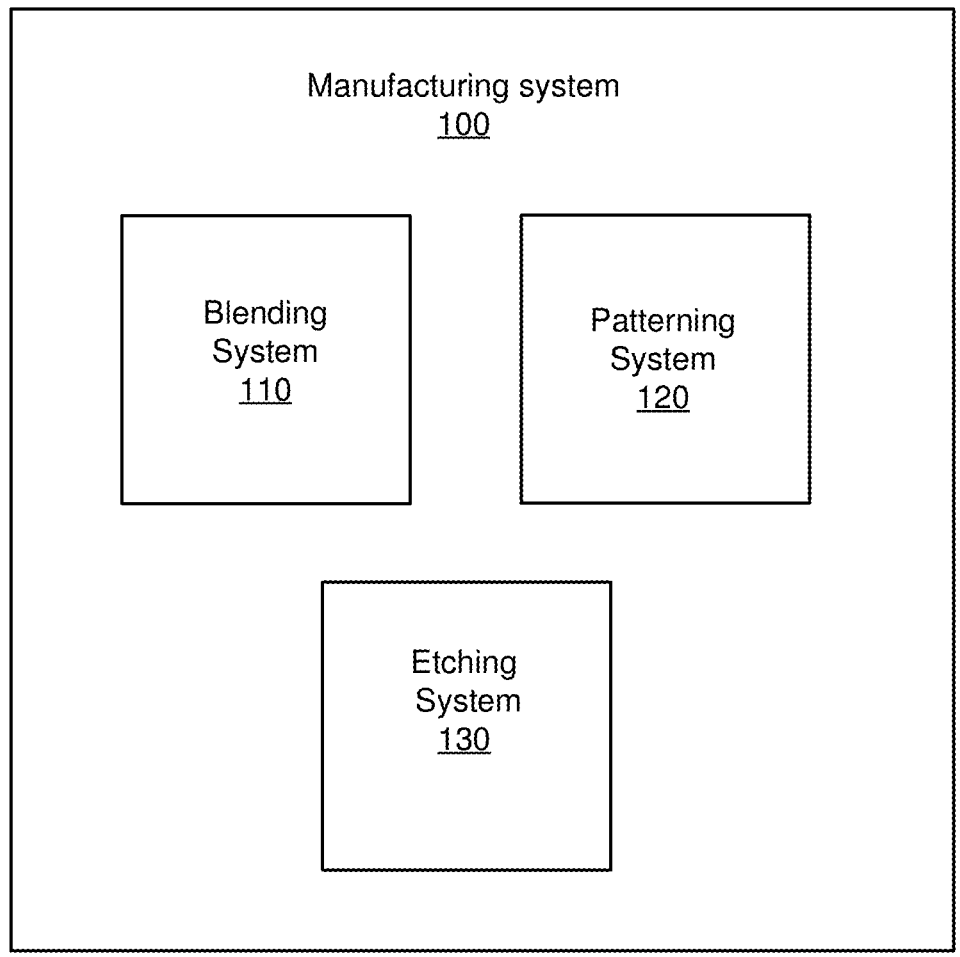
FIG. 1 is a block diagram of a manufacturing system, in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Transparent semiconductors, specifically gallium phosphide (GaP), gallium nitride (GaN), and gallium sulfide (GaS), have remarkably high refractive indices and low absorbance in the visible wavelengths. As discussed in detail below, these materials, in nanoparticle form, are blended with one or more base materials (e.g., imprint and/or spin-on) to form a blended material. The blended material has a refractive index that is higher than the one or more base materials. The blended material may be used to manufacture one or more optical components. An optical component may be, e.g., optical film, diffraction grating, waveguide, diffractive element, some other optical component, etc.

Nanoparticles

In one aspect, provided herein are substrates composed of a material doped with semiconductor nanoparticles.

In some embodiments, the semiconductor nanoparticle is a gallium based semiconductor nanoparticle. In some embodiments, the nanoparticles of gallium based semiconductors are Gallium Phosphide, Gallium Sulfide, or Gallium Nitride.

In some embodiments, the semiconductor nanoparticle has a maximum diameter of about less than 1 μm, such as less than 800 nm, less than 700 nm, less than 600 nm, less than 500 nm, less than 400 nm, less than 300 nm, less than 200 nm, less than 100 nm, less than 90 nm, less than 80 nm, less than 70 nm, less than 60 nm, less than 50 nm, less than 40 nm, less than 30 nm, less than 20 nm, or less than 10 nm. In various embodiments, the semiconductor nanoparticle has a maximum diameter of 10 nm to 800 nm, such as 10 nm to 700 nm, 10 nm to 600 nm, 10 nm to 500 nm, 10 nm to 400 nm, 10 nm to 300 nm, 10 nm to 200 nm, 10 nm to 100 nm, 10 nm to 100 nm, 10 nm to 90 nm, 10 nm to 80 nm, 10 nm to 70 nm, 10 nm to 60 nm, 10 nm to 50 nm, 10 nm to 40 nm, 10 nm to 30 nm 10 nm to 20 nm, 100 nm to 700 nm, 100 nm to 600 nm, 100 nm to 500 nm, 100 nm to 400 nm, 100 nm to 300 nm, 100 nm to 200 nm, 200 nm to 800 nm, 200 nm to 700 nm, 200 nm to 600 nm, 200 nm to 500 nm, 200 nm to 400 nm, 200 nm to 300 nm, 300 nm to 800 nm, 300 nm to 700 nm, 300 nm to 600 nm, 300 nm to 500 nm, 300 nm to 400 nm, 400 nm to 800 nm, 400 nm to 700 nm, 400 nm to 600 nm, 400 nm to 500 nm, 500 nm to 800 nm, 500 nm to 700 nm, 500 nm to 600 nm, 600 nm to 800 nm, 600 nm to 700 nm, or 700 nm to 800 nm.

In various embodiments, at least 40% of the semiconductor nanoparticles within the composition have the same maximum diameter. In some embodiments, at least 50% of the semiconductor nanoparticles have the same maximum diameter. In some embodiments, at least 60% of the semiconductor nanoparticles have the same maximum diameter. In some embodiments, at least 70% of the semiconductor nanoparticles have the same maximum diameter. In some embodiments, at least 80% of the semiconductor nanoparticles have the same maximum diameter. In some embodiments, at least 90% of the semiconductor nanoparticles have the same maximum diameter. In some embodiments, at least 95% of the semiconductor nanoparticles have the same maximum diameter. In some embodiments, at least 99% of the semiconductor nanoparticles have the same maximum diameter.

In certain embodiments, the plurality of semiconductor nanoparticles are in solid state. In certain embodiments, the plurality of semiconductor nanoparticles are dispersed in a liquid. In certain embodiments, the plurality of semiconductor nanoparticles are dispersed in a resin. In certain embodiments, the plurality of semiconductor nanoparticles are dispersed in a film.

Surface Modification

The semiconductor nanoparticle may be chemically or physically treated for surface modification or functionalization. The surface modification may be an oxidation reaction, a reduction reaction, an acid treatment, an electrochemical reduction reaction, or any other appropriate reaction known in the art for creating reactive functional groups on the nanoparticle surface. In some embodiments, the semiconductor nanoparticle is surface modified via an oxidation reaction. Any appropriate oxidative agent or derivative thereof may be used for surface modification of the semiconductor nanoparticles, including but not limited to hydrogen peroxide or any other peroxide, fluorine, chlorine, bromine, nitric acid, sulfuric acid, peroxydisulfuric acid, peroxymonosulfuric acid, sulfur dioxide, nitrous oxide, nitrogen dioxide, potassium nitrate, sodium bismuthate, permanganate, potassium permanganate, sodium perborate, chlorite, chlorate, perchlorate or other analogous halogen compounds, hypochlorite, chromic and dichromic acids, chromium trioxide, and pyridinium chlorochromate, or any combination thereof.

In some embodiments, the semiconductor nanoparticle is modified or functionalized via an acid reaction. Any appropriate acid or derivative thereof may be used for surface modification of the semiconductor nanoparticles, including but not limited to phosphonic acid, phosphoric acid, sulfur acid, fluorosulfuric acid, nitric acid, hydrogen halides such as hydrochloric acid, hydrofluoric acid, hydrobromic acid, hydroiodic acid; halogen oxoacids such as hypochlorous acid, hypofluorous acid, chlorous acid, chloric acid, perchloric acid, and bromine and iodine analogues; succinic acid, fluoroboric acid, hexafluorophosphoric acid, chromic acid, boric acid, sulfonic acids such as methanesulfonic acid, ethanesulfonic acid, benzenesulfonic acid, p-toluenesulfonic acid, trifluoromethanesulfonic acid, polystyrene sulfonic acid; carboxylic acids and halogenated carboxylic acids; or any combination thereof.

In some embodiments, the semiconductor nanoparticle is surface modified via a light treatment, such as ultraviolet (UV) or infrared radiation (IR). In some embodiments, the light treatment wavelength is from 200-1000 nm. In some embodiments, the light treatment wavelength is from 200-300, 300-400, 400-500, 500-600, 700-800, 800-900, or 900-1000 nm. In some embodiments, the semiconductor nanoparticle is modified via flame, corona, plasma, photon, electron beam, ion beam, X-ray, or γ-ray treatment. Any appropriate gas may be used in plasma treatment, including but not limited to, argon, oxygen, nitrogen, fluorine, carbon dioxide, fluorine, or inert gases.

Functional Groups

Functional group refers to a reactive chemical group. The functional group can be linked or coupled to the semiconductor nanoparticle or can be a moiety on a low molecular weight organic compound or ligand linked or coupled to the semiconductor nanoparticle. Functional groups may be linked or coupled covalently or non-covalently to the semiconductor nanoparticle or ligand. Suitable functional groups include but are not limited to carboxyl (—COOH), hydroxyl (—OH), epoxy

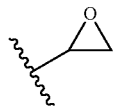 [SMILES: *C1CO1]

carbonyl (—CO—), aldehyde (—COH), primary, secondary, or tertiary amines (—NH$_2$, —NH, —N) maleimide

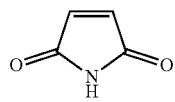

N-hydroxysuccinimide

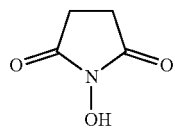

carbodiimide (—N=C=N—), anhydride ((—CO)$_2$O), hydrazide (—CONHNH$_2$—), azide (—N$_3$), alkyne (—CCH), alkene (—C=C—), nitrile (—C≡N), sulfonyl (—SO$_2$—), thiol (—SH), thiocyanate (—SC≡N), phosphate (PO$_4^{3-}$), boronic acid, (—B(OH)$_2$), thioester (—SCO—), cysteine, disulfide (—SS—), alkyl and acyl halides (—X, such as —F, —Cl, —Br, —I), isocyanate (—NCO), sulfonyl chloride (—SO$_2$Cl), acrylate

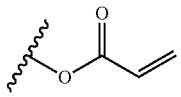

imidoester, biotin, polyethylene glycol, fluorophenyl ester, and Schiff base, or any combination thereof.

In various embodiments, the semiconductor nanoparticle comprises at least one species of functional group. In some embodiments, the semiconductor nanoparticle comprises a plurality of functional group species. The functional group may be attached to a semiconductor nanoparticle surface or a ligand covalently or non-covalently. The functional group may be a chemical moiety on a ligand coupled to the semiconductor nanoparticle. Exemplary methods for functionalizing nanoparticles are disclosed in U.S. Pat. No. 5,580,697, and U.S. Pat. Pubs. US2006/0234269, US2011/0226995, US2009/0099282 which are hereby incorporated by reference in their entireties.

In various embodiments, the functional group is carboxyl, hydroxyl, epoxy, carbonyl, aldehyde, amine, maleimide, N-hydroxysuccinimide, carbodiimide, anhydride, hydrazide, polyethylene glycol, azide, alkyne, alkene, nitrile, sulfhydryl, thiol, thiocyanate, phosphate, borono, thioester, cysteine, disulfide, alkyl and acyl halide, glutathione, maltose, isocyanate, sulfonyl chloride, tosylate ester, carbonate, arylating agent, imidoester, fluorophenyl ester, or Schiff base, or any combination thereof. In some embodiments, the functional groups is an alkyne (—CCH), an alkene (—C=C—), or a hydroxyl (—OH) group.

In various embodiments, the functional group leads to the creation of surface charge of the semiconductor nanoparticle. In some embodiments, the surface charge of the semiconductor nanoparticle is positive. In some embodiments, the surface charge of the semiconductor nanoparticle is negative. In some embodiments, the surface charge of the semiconductor nanoparticle can be tuned by changing the pH of the solution.

Ligands and Polymers

In some embodiments the semiconductor nanoparticle comprises a first ligand comprising a functional group. In one embodiment, the first ligand is a functional group, such as a hydroxyl (—OH) group, or any other appropriate functional group as described herein. In other embodiments, the first ligand is a low molecular weight organic compound comprising one or more functional groups. In some embodiments, the semiconductor nanoparticles comprise at least one second ligand coupled to the one or more functional groups of the first ligand. Ligands may be any appropriate molecular species chemically bound to the one or more functional groups. The ligands may be coupled covalently or non-covalently to the one or more functional groups. Ligands may include monomer units, polymer units, and small molecules. Ligands may also have a functional end group or side group.

Reactive monomers or ligands can also be used as the chemical environment to functionalize the surface of the semiconductor nanoparticle. In various embodiments the ligand or monomer is a low molecular weight organic compound with a functional group. Categories of such monomers include the acrylates, methacrylates, styrenics, butadiene and derivatives and analogs thereof, maleic anhydride and maleic acid esters, vinyl ethers, acrylamide and its derivatives, monomers containing fluorinated or partially fluorinated alkyl chains, nitriles, metal salts of acrylic acid and methacrylic acid, vinylidine and vinyl monomers. Specific examples of such monomers include acrylic acid, methyl acrylate, ethyl acrylate, hydroxyethyl acrylate, butyl acrylate, lauryl acrylate, octadecyl acrylate, 2-(dimethylamino)ethyl acrylate, acryloyl chloride, methacrylic acid, methyl methacrylate, ethyl methacrylate, hydroxyethyl methacrylate, butyl methacrylate, lauryl methacrylate, octadecyl methacrylate, 2-(dimethylamino)ethyl methacrylate, methacryloyl chloride, methacrylic anhydride, monomers with more than one acrylate or methacrylate group on them, derivatives of poly(ethylene glycol) that contain one or more acrylate or methacrylate group, styrene, 2-bromostyrene, 3-bromostyrene, 4-bromostyrene, 2-chlorostyrene, 3-chlorostyrene, 4-chlorostyrene, 2-fluorostyrene, 3-fluorostyrene, 4-fluorostyrene, 4-aminostyrene, divinylbenzene, 4-styrenesulfonic acid (sodium salt), butadiene, isoprene, maleic anhydride, maleic acid, methyl vinyl ether, ethyl vinyl ether, allyl vinyl ether, dodecyl vinyl ether, octadecyl vinyl ether, acrylamide, methacrylamide, N,N-dimethylacrylamide, N-isopropylacrylamide (NIPAAm), CF3, acrylonitrile, methacrylonitrile, calcium, sodium, aluminum, silver and zirconium acrylate and methacrylate, diallyidimethylammonium chloride, vinylidine chloride, vinylidine fluoride, vinyl chloride, vinyl fluoride, itaconic acid, itaconic anhydride, cinnamic acid, cinnamoyl chloride, cinnamonitrile, esters of cinnamic acid and itaconic acid.

In some embodiments, the ligands comprises aphosphonic acid ligand, such as 11-(2-Bromoisobutyrate)-undecyl-1-phosphonic acid, 11-Acryloyloxyundecylphosphonic acid, 12-Chlorododecylphosphonic acid, 12-Bromododecylphosphonic acid, 3-Bromopropylphosphonic acid, 6-Bromohexylphosphonic acid, 12-Iodododecylphosphonic acid, Diethyl-12-iodododecylphosphonate, 12-Aminododecylphosphonic acid, 6-Aminohexylphosphonic acid hydrochloride, 12-Azidododecylphosphonic acid, 6-Azidohexylphosphonic acid, Diethyl-12-azidododecylphosphonate, 12-Cyanododecylphosphonic acid, 12-Mercaptododecylphosphonic acid, 3-Mercaptopropylphosphonic acid, In some embodiments, the ligand comprises a 2,2,6,6-tetramethylpiperidine 1-oxyl (TERMPO) derivative. Exemplary TEMPO derivatives include, but are not limited to, 4-Amino-TEMPO, 4-Acetamido-TEMPO, 2-Azaadamantane-N-oxyl, 4-Carboxy-TEMPO, 4-Hydroxy-TEMPO, 4-(2-Iodoacetamido)-TEMPO, 4-Isothiocyanato-TEMPO, 4-Maleimido-TEMPO, 4-Methoxy-TEMPO, 4-Oxo-TEMPO, 4-Phosphonooxy-TEMPO, or any other TEMP derivative, or any combination thereof.

In some embodiments, the ligand comprises a silyl alkoxide with long alkyl chains or acrylates attached. Exemplary compounds include, but are not limited to, (3-acryloxypropyl) trimethoxysilane, or trichlorododecylsilane, or any combination thereof.

In some embodiments, the ligand comprises a dithioester, a dithiocarbamate, or trithiocarbonate derivative. Exemplary dithioester, a dithiocarbamate, or trithiocarbonate derivatives include, but are not limited to dimethyl trithiocarbonate, phthalimidomethyl trithiocarbonates, cyanomethyl methyl(phenyl)carbamodithioate, cyanomethyl dodecyl trithiocarbonate, 2-Cyano-2-propyl benzodithioate, 4-Cyano-4-(phenylcarbonothioylthio)pentanoic acid, 2-Cyano-2-propyl dodecyl trithiocarbonate, 4-Cyano-4-[(dodecylsulfanylthiocarbonyl)sulfanyl]pentanoic acid, 2-(Dodecylthiocarbonothioylthio)-2-methylpropionic acid (DDMAT), 2'-Cyanobutan-2'-yl 4-Chloro-3,5-dimethylpyrazole-1-carbodithioate, Cyanomethyl 3,5-Dimethylpyrazole-1-carbodithioate, cyanomethyl N-methyl-N-phenyldithiocarbamate, or any combination thereof.

In various embodiments the ligand or monomer with a functional group is a surfactant. Surfactants are compound that lowers the surface tension between two liquids, between a liquid and a solid, or between a liquid and a gas. Surfactants can be amphiphilic organic compounds with both hydrophobic groups and hydrophilic groups. Surfactants can be ionic or non-ionic. Ionic surfactants include anionic, cationic, and zwitterionic surfactants. Ionic surfactants include but are not limited to alkylbenzene sulfonate, fatty acid soap, lauryl sulfate, di-alkyl sulfosuccinate, sodium stearate, sodium lauroyl sarcosinate, lignosulfonate, fatty amine salts, and quaternary ammonium compounds such as cetrimonium bromide. Non-ionic surfactants include but are not limited to polyoxyethylene fatty alcohol ether, polyoxyethylene alkylphenyl ether and polyoxyethylene-polyoxypropylene block copolymers. In some embodiments, the functionalized semiconductor nanoparticle comprises a surfactant.

Any appropriate polymer or monomer known in the art may be used as a ligand. Examples of useful polymers include, without limitation, thiol-terminated poly(butyl acrylate), poly(butyl acrylate), polyethylene, polyethyleneimine, polyvinylethylene, polystyrene, poly(tetra)fluoroethylene, polycarbonate, polymethylmethacrylate (PMMA), polydimethylsiloxane, polyvinylphenol, polyoxymethylene, polymethacrylamide, polymethacryloyloxyethyl phosphorylcholine (MPC), poly(acrylic acid), poly(N-isopropyl acrylamide), poly(ethylene terephthalate), poly(sulfobetaine methacrylate), polybutadiene, poly(amic acid), poly(oligo (ethylene oxide) monomethyl ether methacrylate), poly(ethylene glycol) methacrylate, polyimide polypropylene, polyisobutylene, polybut-1-ene, poly-4-methylpent-1-ene, polyvinylcyclohexane, polyisoprene or polybutadiene, cyclopentene or norbornene, chitosan, polyurethane, poly (ethylene glycol) monomethacrylate (PEGMA), poly(L-lactide), poly(glycidyl methacrylate) (PGMA), poly(dimethyl siloxane), cross linked polyethylene, for example low molecular weight polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), Polystyrene, poly(p-methylstyrene), poly($\alpha$-methylstyrene), acrylates, styrenes, vinyl ethers, epoxides, polyesters, polycarbonates, polyurethanes, or any combination thereof.

Resins and Films

In some embodiments, the semiconductor nanoparticles are incorporated into a substrate. In some embodiments, the substrate is a polymer film. In other embodiments, the substrate is a resin. In some embodiments the resin is a vinyl ether or thiol-ene resin. In other embodiments, the substrate is an epoxy resin or an acrylate resin. In one embodiment the substrate is a resin comprising a crosslinking agent and a catalyst. In some embodiments the catalyst is a photopolymerization catalyst. Resins may include any appropriate combination of monomers known in the art.

Any appropriate epoxy or acrylate known in the art may be used. Exemplary epoxides include, but are not limited to, glycidyl methacrylate, ethylene oxide, propylene oxide, butylene oxide, poly(ethylene glycol), poly(propylene glycol), poly(butylene glycol), epichlorohydrin, glycidyl polyethers of both polyhydric alcohols and polyhydric phenols, bisphenol A epoxy, bisphenol F epoxy, glycidyl ester of neodecanoic acid, flame retardant epoxy resins based on tetrabromo bisphenol A, epoxy novolacs, epoxidized fatty acids or drying oil acids, epoxidized diolefins, epoxidized unsaturated acid esters as well as epoxidized unsaturated polyesters, or any combination thereof. Exemplary acrylates include, but are not limited to, methacrylate, methyl acrylate, ethyl acrylate, 2-chloroethyl vinyl ether, 2-ethylhexyl acrylate, hydroxyethyl methacrylate, butyl acrylate, butyl methacrylate, or trimethylolpropane triacrylate (TMPTA).

Any vinyl ether monomer known in the art may be used for the resin. The vinyl ethers may be mono-functional, multi-functional (i.e., having two or more polymerizable vinyl ether moieties), or a combination thereof. Examples of suitable vinyl ethers include, but are not limited to, fluoroethylene vinyl ethers such as copolymers of tetrafluoroethylene and perfluoroalkylvinylether, hydroxy butyl vinyl ether (HBVE), 1,4-cyclohexanedimethanol divinyl ether (CHVE), propenyl ether of propylene carbonate (PEPC), octadecyl vinylether, triethylene glycol divinyl ether (DVE-3), tetraethylene glycol divinyl ether, vinyl etheroligomers, vinylether/maleate oligomers, vinyl ethermonomers, butanediol divinyl ether, vinyl ethers, vinyl ether-maleate mixtures, fluorinated vinyl ethers, stearyl vinyl ether, behenyl vinyl ether, eicosyl vinyl ether, isoeicosyl vinyl ether, isotetracosyl vinyl ether, poly(tetrahydrofuran) divinyl ether, tris-2,4,6-(1-vinyloxybutane-4-)oxy-1,3,5-triazine, and bis-1,3-(1-vinyloxybutane-4-oxycarbonyl-benzene, or any combination thereof.

Any appropriate monomer with a thiol or alkene functional group known in the art may be used for the resin. Thiol-ene resins are formed by the reaction of an olefin ('ene' or alkene) and a thiol (mercaptans), which polymerize on exposure to UV or visible light or electron radiation. Any appropriate olefin and mercaptan know in the art may be used. Thiol-ene resins may or may not include acrylates, such as methacrylate. Any thiol compound known in the art may be used as the thiol compound of the thiol-ene resin. Exemplary thiols include, but are not limited to, aliphatic monomeric polythiols (ethane dithiol, hexamethylene dithiol, decamethylene dithiol, tolylene-2,4-dithiol, and the like, polymeric polythiols such as a thiol-terminated ethylcyclohexyl dimercaptan polymer, cycloaliphatic dithiols, 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodiglycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate, 3-mercapto-β,4-dimethyl-cyclohexaneethanethiol, cyclohexane dimethane dithiol, and 3,7-dithia-1,9-nonanedithiol, aromatic dithiols, trithiol functional compounds include, trimethylolethane tris-mercaptopropionate, trimethylolpropane tris-mercaptopropionate (TMPTSH), trimethylolethane tris-mercaptoacetate, and trimethylolpropane tris-mercaptoaacetate glycerol tri(11-mercaptoundecate), trimethylol propane tri(11-mercaptoundecate), tetrafunctional thiols include pentaerythritol tetramercapto propionate, pentaerythritol tetramercapto acetate, and pentathritoltetra(11-mercaptoundecate), or any combination thereof. Ene compounds include, but are not limited to, molecules having one or more cyclic ene groups or one or more alkene groups. The cyclic ene functional group can be selected from the group comprising cyclopentene, cyclohexene, norbornene, and other fused ring structures. Cyclic ene groups include but are not limited to compounds derived from Diels Alder reactions of dienes, such as cyclopentadiene, cyclooctadiene, hexadiene, furan thiophene, and pyran. Exemplary thiol-ene resins include thiol-norbornene resins such as pentaerythritol tetra(3-mercaptopropionate) and trimethylolpropane tri-norborn-2-ene-5-carboxylate (PETMP/TMPTN) or thiol-ene resin such as pentaerythritol tetra(3-mercaptopropionate) and triallyl-1,3,5-triazine-2,4,6-(1H,3H,5H)-trione (PETMP/TATATO). Exemplary thiol-ene resins are disclosed in U.S. Pat. Pub US2007/0043205, which is hereby incorporated by reference in its entirety.

The resins may be reacted with a catalyst. Any appropriate catalyst known in the art may be used. Exemplary catalysts are disclosed in U.S. Pat. Pub. US2006/0194063, hereby incorporated by reference in its entirety. Exemplary catalysts include, but are not limited to, organophosphonium salts; acid anhydrides such as phthalic anhydride, trimellitic anhydride and pyromellitic anhydride; and alicyclic acid anhydrides such as tetrahydrophthalic anhydride, methyltetrahydrophthalic anhydride, hexahydrophthalic anhydride, methylhexahydrophthalic anhydride, methyl endo methylenetetrahydrophthalic anhydride, dodecenylsuccinic anhydride and trialkyltetrahydrophthalic anhydride; polyhydric phenols such as catechol, resorcin, hydroquinone, bisphenol F, bisphenol A, bisphenol S, biphenol, phenolic novolaks, cresol novolaks, novolak versions of dihydric phenols such as bisphenol A, trishydroxyphenylmethanes, aralkylpolyphenols, and dicyclopentadienepolyphenols; thiols or mercaptans; and amines such aliphatic and alicyclic amines such as bis(4-aminocyclohexyl)methane, bis(aminomethyl)cyclohexane, m-xylylenediamine and 3,9-bis(3-aminopropyl)-2,4,8,10-tetraspiro[5,5]undecane; aromatic amines such as methaphenilenediamine, diaminodiphenylmethane and diaminodiphenylsulfone; tertiary amines such as benzyldimethylamine, 2,4,6-tris(dimethylaminomethyl)phenol and 1,8-diazabicyclo-(5,4,0)-undecene-7,1,5-azabicyclo-(4,3,0)-nonene-7, and their salts. Tertiary amines and quaternary ammonium salts may be used.

Phosphorous containing compounds may also be used as a catalyst. Examples include, but are not limited to, triphenyl phosphine, tributyl phosphine, tributylphosphonium acetate, tributylphosphonium bromide, tributylphosphonium chloride, tributylphosphonium fluoride, tributylphosphonium iodide, tetraphenylphosphonium chloride, tetraphenylphosphonium bromide, tetraphenylphosphonium acetate, and phosphine salts, and any combination thereof.

In some embodiments the catalyst is a photopolymerization catalyst. In some embodiments the catalyst is a cationic photopolymerization catalyst. In some embodiments, the catalyst is a photoinitiator. A photoinitiator may be a UV photoinitiator or a visible light photoinitiator. Any appropriate photoinitiator known in the art may be used, including, but not limited to type I photoinitiators, type II photoinitiators, diphenyl(2,4,6-trimethylbenzoyl)phosphine oxide, 2-hydroxy-2-methylpropiophenone, azobisisobutyronitrile (AIBN), dimethoxyphenylacetophenone, α-hydroxyacetophenone, α-aminoacetophenone, titanocene, benzoylphosphineoxide, bisbenzolphophineoxide, benzophenone, thioxanthones, methylphenylglyoxylate, camphorquinone, xanthic dyes, thiazine, pyrromethene, n-phenyl glycine, tetrabutyl borate, triazine, iodonium salts, onium salts, borate salts, triazine compounds, azo compounds, hydroxybenzophenone, hydroxyacetophenone, acylphosphine oxide, bis-acylphosphine oxide and phosphineoxide (TPO), or any combination thereof. In some embodiments, the photoinitiator is a mix of diphenyl(2,4,6-trimethylbenzoyl)phosphine oxide and 2-hydroxy-2-methylpropiophenone. Descriptions of photopolymerization catalysts and photopolymerization reactions are found in U.S. Pat. No. 7,575,851, U.S. Pat. Pub. US2009/0123642, U.S. Pat. Pub. US2009/0012203, and Chen M, et al. *Chem. Rev* 2016, 116(17): 10167-10211 which are hereby incorporated by reference in their entireties.

In some embodiments, the catalyst is a photoacid generator or a photobase generator. Any appropriate photoacid generator or photobase generator may be used.

Exemplary photoacid generators include, but are not limited to, onium salt-derived photoacid generators, such as (4'-methylphenylsulfonyloxy)naphthalene-1-sulfonate, (phenylsulfonyloxy)naphthalene-1-sulfonate, 2-naphthylsulfonyloxy)naphthalene-1-sulfonate, diphenyliodonium, bis(4-tert-butylphenyl)iodonium, 4-methoxyphenylphenyliodonium, 4-ethoxyphenylphenyliodonium, and 4-tert-butoxy-phenylphenyliodonium, triphenyl-sulfonium, 4-hydroxyphenyldiphenylsulfonium, mono-, bis-, and tris-(4-methyl-phenyl)diphenylsulfonium, mono-, bis-, and tris-(4-tert-butylphenyl)diphenylsulfonium, triphenylsulfonium, 4-tert-butoxy-phenyldiphenylsulfonium, dimethylphenylsulfonium, 4-methyl-4'-(2-methylpropyl)diphenyliodonium hexafluorophosphate, 4-isopropyl-4'-methyldiphenyliodonium tetrakis(pentafluorophenyl)borate, bis(4-tert-butylphenyl)iodonium trifluoromethanesulfonate, diphenyliodonium-2-carboxylate monohydrate, diphenyliodonium chloride, diphenyliodonium bromide, diphenyliodonium iodide, diphenyliodonium nitrate, diphenyliodonium hexafluoroarsenate, diphenyliodonium perchlorate, bis(4-tert-butylphenyl)iodonium hexafluorophosphate, phenyl [2-(trimethylsilyl)phenyl]iodonium trifluoromethane sulfonate, or combinations thereof. In some embodiments, the photoinitiator is a photoacid generator 4-Isopropyl-4'-methyldiphenyliodonium Tetrakis (pentafluorophenyl)borate. Descriptions of onium salt photoacid generators are found in U.S. Pat. Nos. 6,692,893 and 7,851,115 which are hereby incorporated by reference in their entireties.

Various photobase generators are known in the art, including bicarbamates (urethane derivatives), α-aminoketone derivatives, quaternary ammonium derivatives, enzoyloxy-carbonyl derivatives and O-acyloxime derivatives. Any appropriate photobase generator known in the art may be used. Exemplary photobase generators include, but are not limited to, benzyl carbamates and benzoin carbamates, oxime ester compounds like o-carbamoyloximes, ammonium compounds like quaternary ammonium tetraphenyl borate salts, dimethoxybenzyl urethane compounds, orthonitrobenzyl urethane compounds, aromatic sulfonamides, alpha-lactams, N-(2-arylethenyl) amides, 2-hydroxy-2-phenylacetophenone N-cyclohexyl carbamate, o-nitrobenzyl N-cyclohexyl carbamate, N-cyclohexyl-2-naphthalene sulfonamide, 3,5-dimethoxybenzyl N-cyclohexyl carbamate, N-cyclohexyl p-toluene sulfonamide, and dibenzoin isophorone dicarbamate, or any combination thereof.

In some embodiments, the ligands or polymers coupled to the semiconductor nanoparticle are crosslinked. Any appropriate crosslinker known in the art may be used. Exemplary crosslinkers include, but are not limited to, a compound having a phenolic group, a silanol group, a thiol group, a phosphate group, a sulfonate group, a carboxyl group, a carboxylic anhydride group, an acrylate group, or any other appropriate group. Crosslinkers may have one or more functional groups. Exemplary crosslinkers include, but are not limited to di- or tri-functional urethane acrylate oligomers, such as diurethane dimethacrylate (DUDMA), polyethylene glycol dimethacrylate (PEGDMA) 1,6-hexanediol diacrylate, 1,9-nonanediol dimethacrylate, 1,4-Butanediol dimethacrylat, 1,3-butanediol dimethacrylate, ethylene glycol diacrylate (EGDA), 1,5-Pentanediol dimethacrylate, Tetraethylene glycol diacrylate (TetEGDA), Polyethylene glycol diacrylate, Bis(2-methacryoxyethyl) phosphate), Ethylene Glycol Dimethacrylate, (EGDMA), diethylene glycol diacrylate (DEGDA), Diethylene glycol dimethacrylate, Poly(ethylene glycol) diglycidyl ether (PEGDGE 200), Polyethylene glycol dimethacrylate (PEGDMA 1000), polyethylene glycol (PEG), and triethylene glycol dimethacrylate, or any combination thereof.

Polymerization

In some embodiments, the ligands are coupled to a functional group coupled to the semiconductor nanoparticle in a polymerization reaction. Any appropriate polymerization process known in the art may be used. Such methods include, but are not limited to, various surface initiated polymerization techniques such as atom transfer radical polymerization (ATRP), nitroxide-mediated radical polymerization (NMP), reversible addition-fragmentation chain transfer polymerization (RAFT), surface initiated polymerization (SIP), Ring-Opening Metathesis Polymerization (ROMP), cationic, anionic, free radical, frontal and ring opening polymerization, or any combination thereof. In some embodiments, the polymerization reaction is an atom transfer radical polymerization (ATRP). In some embodiments, the polymerization reaction is azide-alkyne or thiol-ene click chemistry.

The polymerization reaction of the at least one ligand coupled to the functionalized semiconductor nanoparticle may be a direct attachment of a polymer to the functionalized semiconductor nanoparticle. This is termed a "grafting to" polymerization reaction. The polymerization of the semiconductor nanoparticle may also be a solution polymerization reaction in which monomers are added to the functionalized semiconductor nanoparticle to grow a polymer. This is termed a "grafting from" polymerization reaction. "Grafting to" and "grafting from" polymerization reactions are described in Francis, R. et al. *Polymer Review*, 54:268-347, 2014, the disclosure of which is hereby incorporated by reference in its entirety.

FIG. 1 is a block diagram of a manufacturing system 100, in accordance with one or more embodiments. The manufacturing system 100 includes a group of sub-systems that can be used to create optical an optical component. An optical component is a structure that affects light in a particular optical band (e.g., visible band and/or Infrared band) and is composed of a blended material. An optical element may be, e.g., an optical film, a diffraction grating (1-dimensional or 2-dimensional), a waveguide, a Fresnel lens, a positive lens, a negative lens, some other structure that affects light, or some combination thereof. The manufacturing system 100 includes a blending system 110, a patterning system 120, an etching system 130, or some combination thereof. Some embodiments of the manufacturing system 100 have different components than those described here. Similarly, the functions can be distributed among the components in a different manner than is described here. Note that in alternate embodiments (not shown) the blending system 110 is independent and separate from the manufacturing system 100.

The blending system 110 creates blended materials. A blended material has a refractive index that is higher than the one or more base materials. The base materials include a substrate that has a first index of refraction and nanoparticles of Gallium based semiconductors (e.g., GaN, GaS, GaP, etc.) that have a second index of refraction that is higher than the index of refraction of the substrate. The substrate and the nanoparticles are substantially transparent to a particular optical band (e.g., visible light and/or infrared light). The blending system 110 creates the blended materials by first surface modifying the Gallium based semiconductors to change the surface charge or reactive groups present on the surface of the Gallium based semiconductor. In some embodiments the surface modification is a chemical or physical treatment such as oxidation, acid reaction, or UV irradiation. The blend system 110 also functionalizes the semiconductor nanoparticles with one or more functional groups or low weight organic compounds with one or more reactive functional groups. Low molecular weight organic compounds with functional groups include, but are not limited to, surfactants, acrylates, and epoxides. The blend system 110 can also couple polymer chains to the functionalized semiconductor nanoparticle. One method of coupling a polymer is the "grafting to" method in which a polymer chain with a function end or side group is reacted with the functionalized semiconductor nanoparticle, resulting in a one-step coupling reaction that couples the polymer chain to the nanoparticle via the functional group. Another method of coupling a polymer is the "grafting from" method in which the polymer chain is grown on the functionalize nanoparticle by a solution polymerization reaction. The polymerization reaction may be an anionic, cationic, or controlled free radical polymerization reaction. In some embodiments, the "grafting from" polymerization reaction is a controlled free radical reaction, such as RAFT or ATRP. In some embodiments, the "grafting to" reaction is an azide-alkyne or thiol-ene click chemistry.

The patterning system 120 forms one or more optical elements using blended material. The patterning system 120 may be similar to a system of fabricating devices used to form an integrated circuit, and may include such components as an etching component, a thin film manufacturing component, an oxidation component, and so on.

The patterning system 120 is a system that patterns a blended material to form one or more optical components (e.g., a diffraction grating). In some embodiments, the patterning system 120 includes a convection oven, a hot plate, a cool plate, an infrared lamp, a wafer spinner, a mask aligner, an exposure system, a wet bench based developer system, or some combination thereof. In one example, the patterning system 120 includes a pair of convection ovens for processing batches of wafers through hard and soft baking for dehydration purposes at a temperature in the range of 150-200° C., a programmable wafer spinner, a contact-type mask aligner, and an exposure system with a mercury source of intensity close to 25 mW/cm$^2$. The patterning system 120 may also include at least one of a projection lithography system, an imprint lithography system, and an interferometric imaging system. The patterning system 120 may also perform coating by one or more of the following: spin coating, inkjet, drop casting, chemical vapor deposition (CVD), atomic layer deposition (ALD), and/or physical vapor deposition (PVD).

The etching system 130 is a system that removes material from a substrate that has been patterned by the patterning system 110 to form some types of optical components. The etching system 130 is based on a physical process, a chemical process, or some combination thereof. The etching system 130 may process the patterned substrate, and then pass the substrate back to the patterning system 120 (e.g., for additional patterning).

The etching system 130 may include various components. For example, the etching system 130 may include a wet bench, an ion milling module, a plasma based reactive ion etching module, a chemical mechanical polishing module, or some combination thereof. In a first configuration, the etching system 130 includes a wet bench which performs a chemical etching using a combination of acids, bases, and solvents at a range of temperatures and concentrations. In a second configuration, the etching system 130 includes an ion milling module that performs a physical removal of a portion of the thin films deposited on the substrate at an extremely low pressure and using a high accelerating potential in order to accelerate electrons impacting the neutral gas atoms with enough energy to ionize the gas atoms. In a third configuration, the etching system 130 includes a plasma based reactive ion etching (RIE) module based on a chemically reactive plasma at a low pressure and an external electromagnetic field to remove one or more thin films of material deposited on the substrate. In a fourth configuration, the etching system 130 includes a chemical mechanical polishing (CMP) module that performs smoothening of one or more thin films of materials based on a combination of chemical and mechanical forces. In some examples, the etching system 130 uses an abrasive and corrosive chemical slurry along with a polishing pad and retaining ring to perform the chemical mechanical polishing on one or more thin films deposited on the substrate patterned by the patterning system 110.

Together the patterning system 120 and the etching system 130 fabricate one or more optical components using blended material from the blending system 110. Some example optical components are discussed below with regard to FIGS. 4 and 5.

Figure 2:
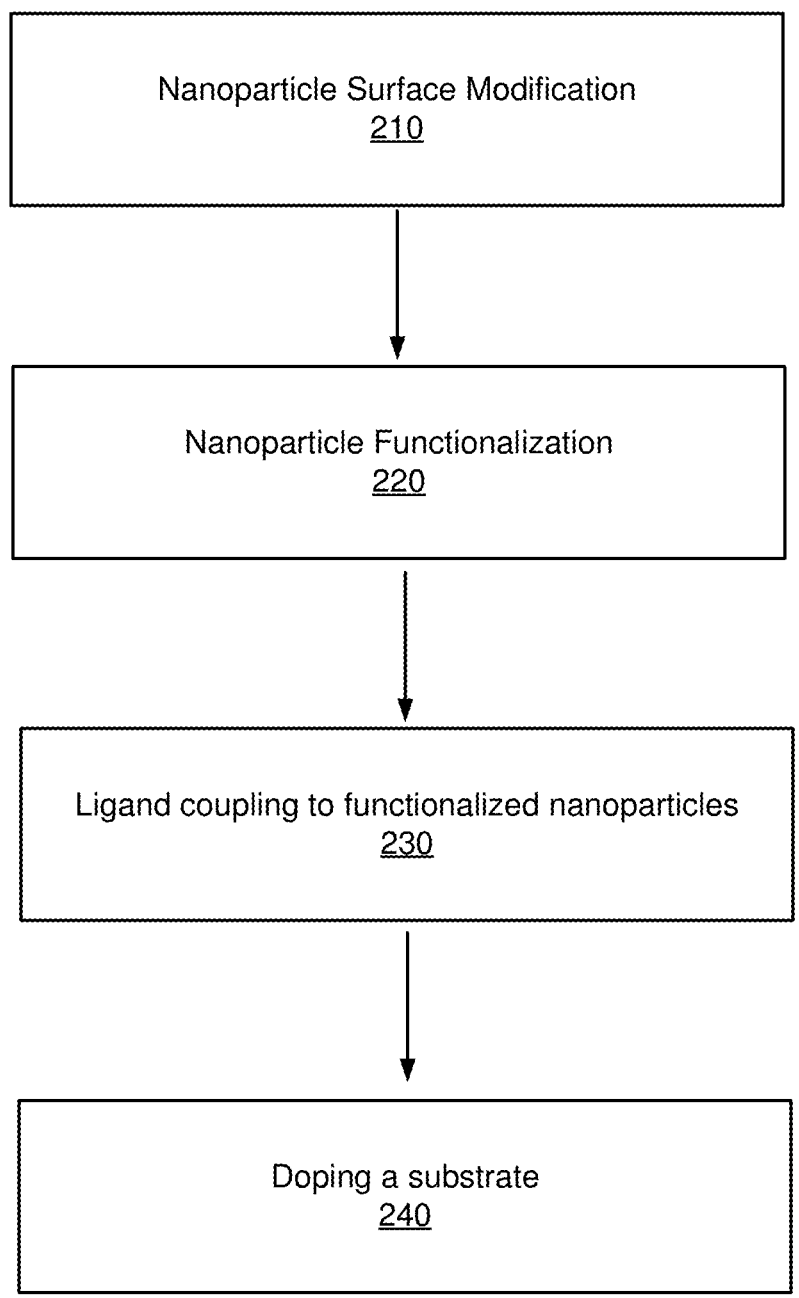
FIG. 2 is a flowchart illustrating the process for creating a blended material, in accordance with one or more embodiments.

FIG. 2 is a flowchart illustrating the process 200 for creating a blended material, in accordance with one or more embodiments. In some embodiments, the process 200 is performed by the blending system 110. Other entities may perform some or all of the steps of the process in other embodiments. Likewise, embodiments may include different and/or additional steps, or perform the steps in different orders.

The blending system 110 surface modifies 210 one or more nanoparticles of Gallium based semiconductors. The surface modification of the one or more nanoparticles may be a chemical or physical treatment. Chemical surface modification treatment include oxidation or acid reactions. Physical surface modifications include UV irradiation, flame, corona, plasma, photon, electron beam, ion beam, X-ray, or γ-ray treatment. One or more surface modification reactions may be applied to the one or more nanoparticles.

The blending system 110 functionalizes 220 the one or more nanoparticles to produce one or more functionalized nanoparticles. One or more functionalization reactions may be used to functionalize the one or more nanoparticles. In some embodiments, the functionalization reaction is a phosphonic acid-ligand functionalization reaction. The ligand may be functionalized with one or more reactive groups, such as azides, alkynes, alkenes, hydroxyls, thiols, or any other functional group as described herein.

The blending system 110 couples 230 ligands to the one or more functionalized nanoparticles. In some embodiments, the ligands may be monomers, polymers, or small molecules. In one coupling reaction, the ligands are functionalized polymer chains grafted to the one or more functionalized nanoparticles. In a different coupling reaction, the ligands are monomers. The one or more functionalized nanoparticles may undergo one or more coupling reactions. The coupling reactions may be at least one of an anionic, a cationic, a frontal ring opening, a surface-initiated, or a controlled free radical polymerization reaction.

The blending system 110 dopes a substrate 240 with the one or more functionalized nanoparticles that are coupled to ligands.

Figure 3A:
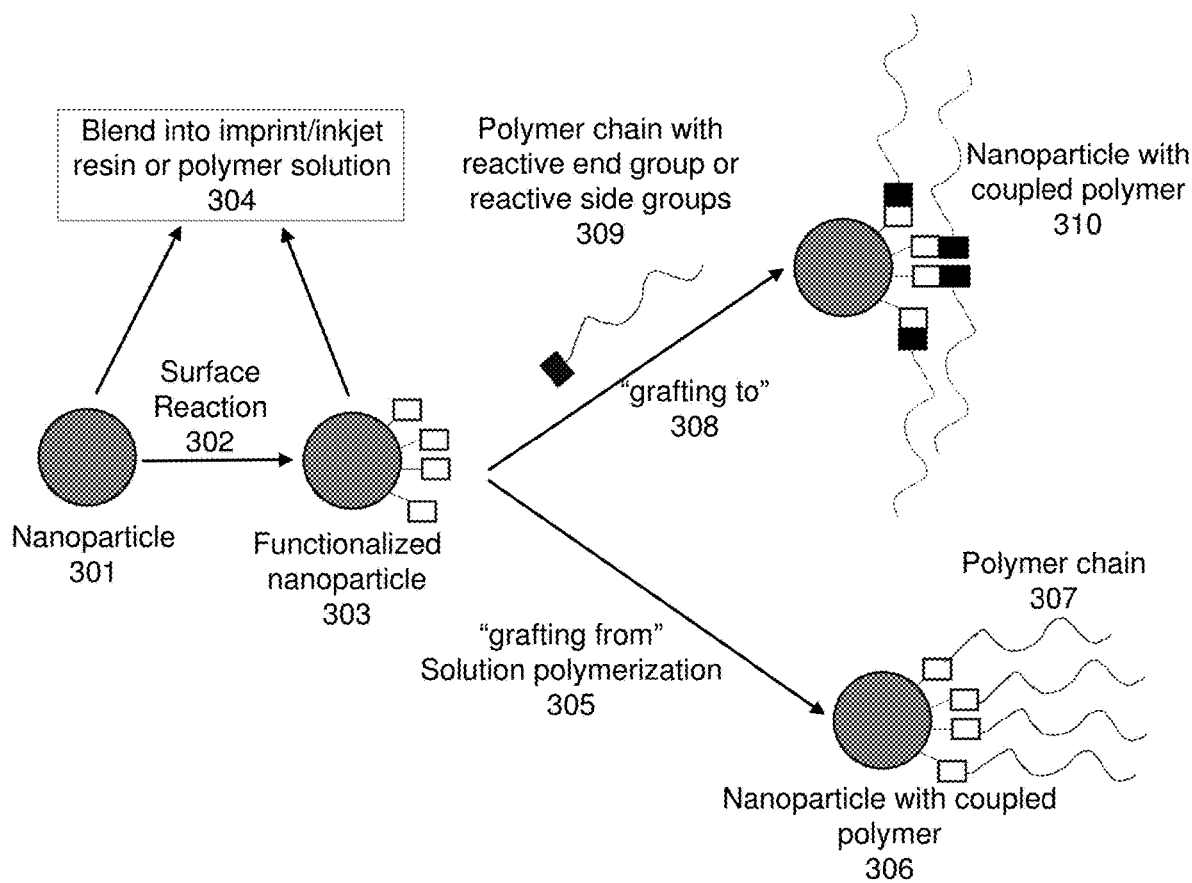
FIG. 3A illustrates an example process for manufacture of a functionalized semiconductor nanoparticle, in accordance with various embodiments.

FIG. 3A illustrates an example process for manufacture of one or more functionalized semiconductor nanoparticles, in accordance with various embodiments. A semiconductor nanoparticle 301 may be treated 302 (e.g., chemically and/or physically) for surface modification and functionalization, resulting in a semiconductor nanoparticle with surface functional groups 303. Functional groups can be directly coupled to the surface of the nanoparticle, or be a chemical moiety of a first ligand coupled to the surface of the nanoparticle. Non-surface modified and functionalized semiconductor nanoparticles 301 may also be used. The non-functionalized nanoparticle or the functionalized nanoparticle may be blended directly in imprint/inkjet resin or a polymer solution 304. The functionalized nanoparticle may also be used to manufacture nanoparticle-polymer composites via two processes: a "grafting from" 305 process where the second ligand comprising the polymer chain 307 is grown on the functionalized semiconductor nanoparticle via more than one coupling reaction initiated from the functional group; or a "grafting to" 308 process wherein a functionalized semiconductor nanoparticle is reacted with a second ligand comprising a functionalized polymer chain with reactive end or side groups 309. The "grafting from" reaction may be a solution polymerization reaction. The semiconductor nanoparticles with coupled polymers 306, 310 may be blended into imprint/inkjet resin or manufactured into a polymer film.

Figure 3B:
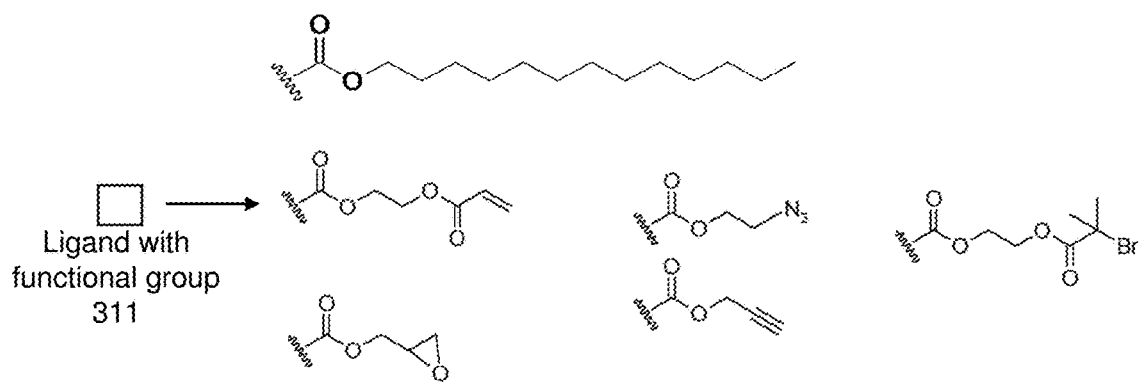
FIG. 3B is an illustration of exemplary low molecular weight organic compounds with functional groups coupled to the semiconductor nanoparticles, in accordance with one or more embodiments.

FIG. 3B shows an exemplary illustration of possible ligands comprising functional groups 311 that can be coupled to the semiconductor nanoparticle, including surfactants with long alkyl side chains, acrylates, epoxides, "click" chemistry coupling reactions groups, such as azides and alkyne groups, or functional groups capable of initiating polymerization reactions such as halogens. The wavy line indicates the point of attachment of the exemplary functional moiety to the nanoparticle.

Figure 4:
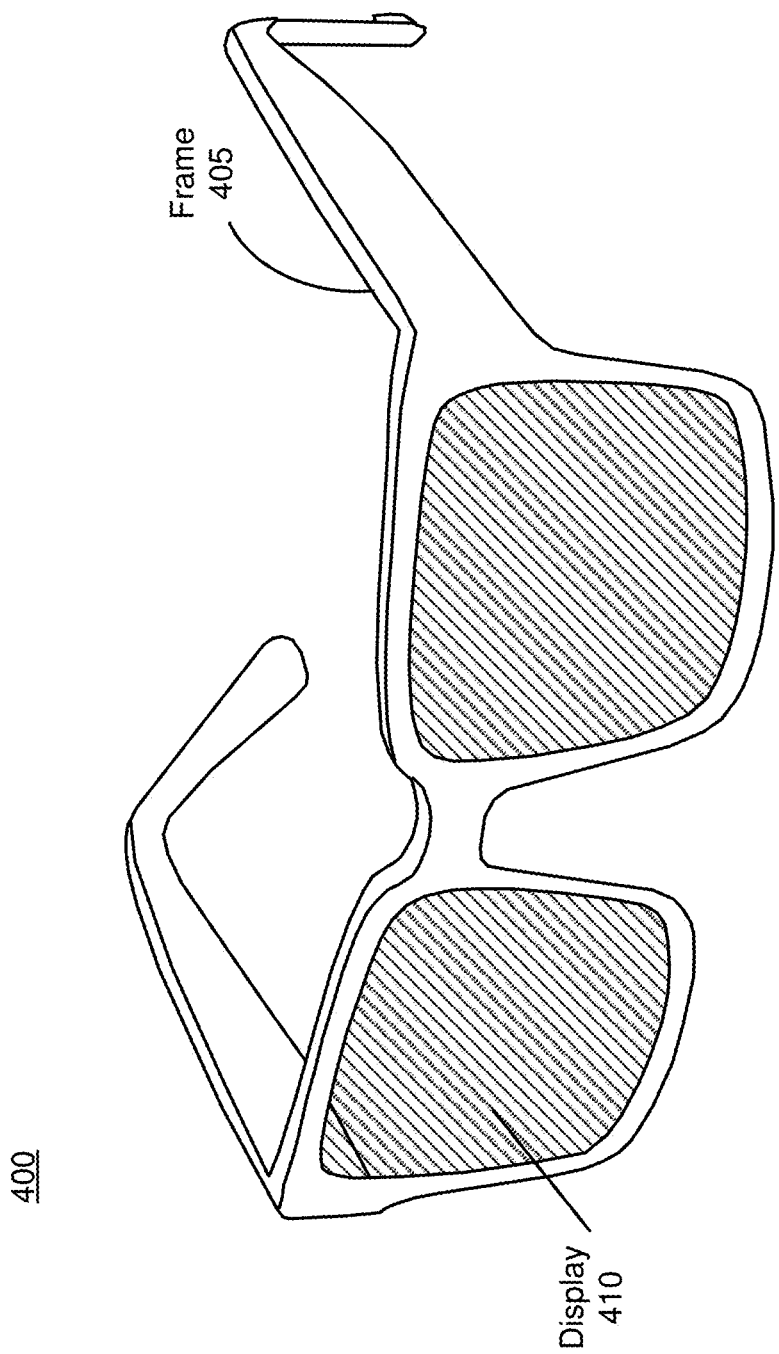
FIG. 4 is a diagram of a near-eye-display (NED), in accordance with one or more embodiments.

FIG. 4 is a diagram of a near-eye-display (NED) 400, in accordance with one or more embodiments. The NED 400 presents media to a user. Examples of media presented by the NED 400 include one or more images, video, audio, or some combination thereof. In some embodiments, audio is presented via an external device (e.g., speakers and/or headphones) that receives audio information from the NED 400, a console (not shown), or both, and presents audio data based on the audio information. The NED 400 is generally configured to operate in artificial reality systems. For example, in some embodiments, the NED 400 may augment views of a physical, real-world environment with computer-generated elements (e.g., images, video, sound, etc.).

The NED 400 shown in FIG. 4 includes a frame 405 and a display 410. The frame 405 includes one or more optical elements which together display media to users. The display 410 is configured for users to seethe content presented by the NED 400. As discussed below in conjunction with FIG. 5, the display 410 includes at least one waveguide display. A waveguide display includes a source assembly to generate an image light to present media to an eye of the user via at least one output waveguide.

Figure 5:
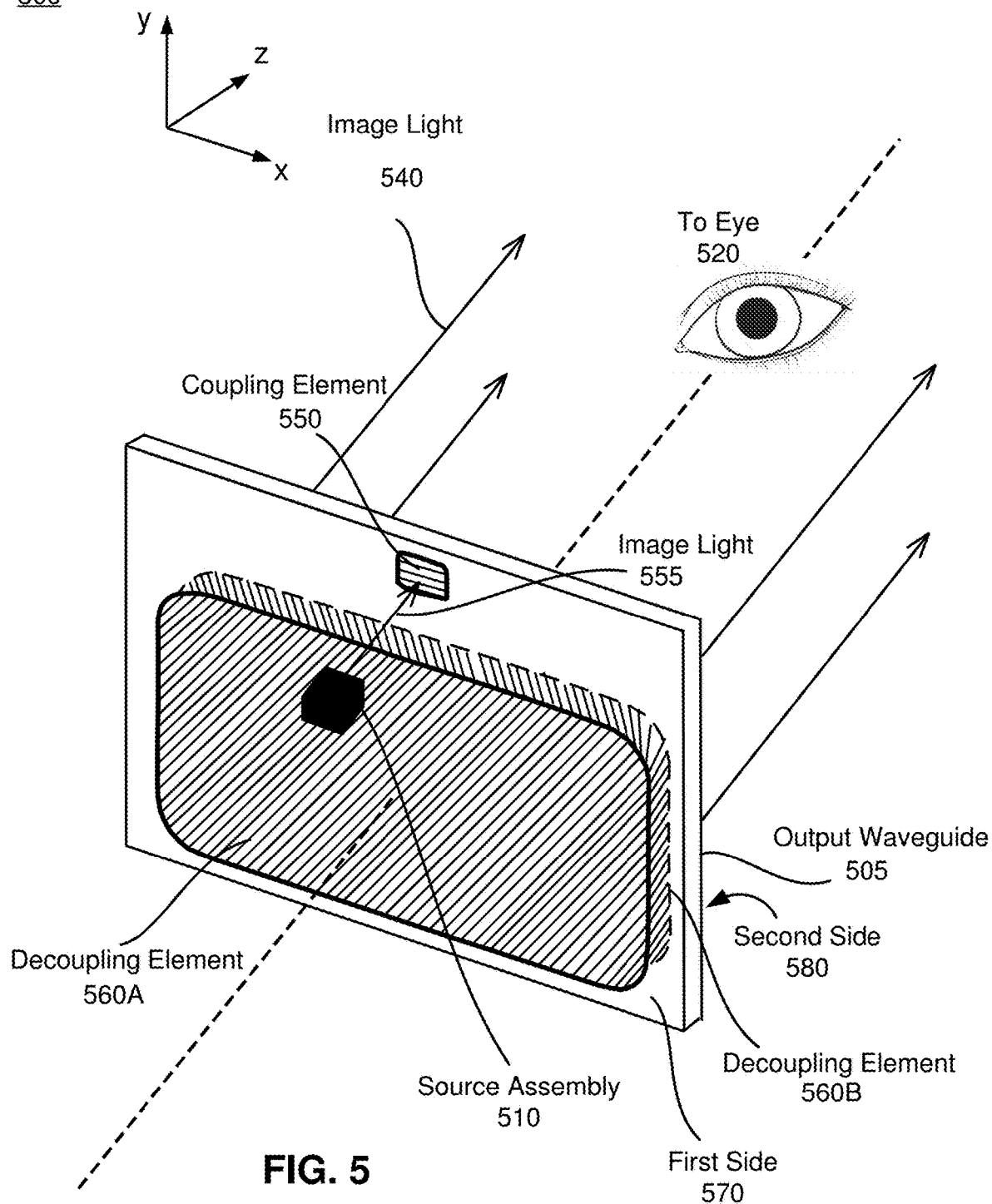
FIG. 5 illustrates an isometric view of a waveguide display, in accordance with one or more embodiments.

FIG. 5 illustrates an isometric view of a waveguide display 500, in accordance with an embodiment. In some embodiments, the waveguide display 500 is a component of the NED 400. In alternate embodiments, the waveguide display 500 is part of some other NED, or other system that directs display image light to a particular location.

The waveguide display 500 includes an output waveguide 505 and a source assembly 510. The source assembly 510 generates image light. The source assembly 510 includes a source array and an optics system (not shown here). The source assembly 510 generates and outputs an image light 555 to a coupling element 550 of the output waveguide 505.

The output waveguide 505 is an optical waveguide that outputs image light to an eye 520 of a user. The output waveguide 505 receives the image light 555 at one or more coupling elements 550, and guides the received input image light to one or more decoupling elements 560. In some embodiments, the coupling element 550 couples the image light 555 from the source assembly 510 into the output waveguide 505. The coupling element 550 may be, e.g., a diffraction grating, a holographic grating, some other element that couples the image light 555 into the output waveguide 505, or some combination thereof. For example, in embodiments where the coupling element 550 is diffraction grating, the pitch of the diffraction grating is chosen such that total internal reflection occurs, and the image light 555 propagates internally toward the decoupling element 560. For example, the pitch of the diffraction grating may be in the range of 300 nm to 600 nm.

The decoupling elements 560A and 560B together decouple the total internally reflected image light from the output waveguide 505. The decoupling elements 560A, 560B may be, e.g., a diffraction grating, a holographic grating, some other element that decouples image light out of the output waveguide 505, or some combination thereof. For example, in embodiments where the decoupling elements 560A, 560B are diffraction gratings, the pitches of the diffraction gratings are chosen to cause incident image light to exit the output waveguide 505. For example, a pitch of a diffraction grating may be in the range of 300 nm to 600 nm.

An orientation and position of the image light exiting from the output waveguide 505 is controlled by changing an orientation and position of the image light 555 entering the coupling element 550.

Some or all of the output waveguide 505, the coupling element 550, the decoupling element 560A, the decoupling element 560B, or some combination thereof are composed of a blended material, and may be manufactured as described above with reference to FIGS. 1-3B. In the illustrated embodiment, the output waveguide 505, the coupling element 550, the decoupling element 560A, the decoupling element 560B, are all substantially transparent to light in a visible band. Additionally, in some embodiments, they also may be substantially transparent light in a portion of the IR band. The use of the blended materials including nanoparticles of GA based semiconductors allows for the optical components to have a higher effective index of refraction than is found in optical components manufactured using conventional means (e.g., non-blended materials). For example, refractive indices for purely organic materials which are transparent in visible spectrum and liquids at room temperature (suitable for imprint) are typically no more than 1.76. Blending organic materials with non-organic nanoparticle fillers, especially gallium-based semiconductors, can achieve indices greater than 1.85. In addition, using Ga-based semiconductors in place of other transition metal oxides (zirconium oxide, titanium oxide, etc.) can achieve a given refractive index with lower nanoparticle loadings. This has major advantages when it comes to manufacturing with these types of resins, as mechanical and optical properties tend to worsen as nanoparticle loading is increased in a given resin. Lower nanoparticle loadings also improve material homogeneity inside high aspect ratio features, particularly for imprinted features. Resins with higher nanoparticle loadings tend to have higher nanoparticle concentrations at the base of a feature, and lower concentrations near the tip, due to the fact that fluid fills the feature from bottom to top and viscous forces act to reduce the concentration of nanoparticles inside the fluid as it rises to fill the feature. The higher effective index of refraction enables smaller and/or lighter optical components (e.g., less material is needed to bend light) to perform particular design functions, which is advantageous for uses in NEDs and/or head-mounted display.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

EXAMPLES

Figure 6A:
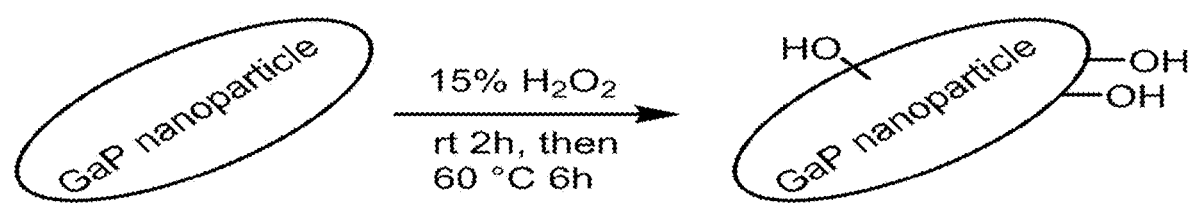
FIG. 6A illustrates the process of oxidizing GaP nanoparticles with hydrogen peroxide (H$_2$O$_2$).

Example 1: Oxidation of GaP Nanoparticle Surface by Basic Hydrogen Peroxide 1 g of dry GaP nanoparticles is added to a basic solution of 15% hydrogen peroxide (ph=13). The mixture is stirred for 2 hours at room temperature, then heated to 60° C. in an open flask for 6 hours. The flask is cooled to room temperature, and the nanoparticles are isolated by repeated centrifugation and re-dispersion in water (3×). After the final centrifugation, the nanoparticles are dried in a vacuum oven for 2 hrs at 60° C. FIG. 6A shows a diagram of the oxidation of GaP nanoparticles.

Figure 6B:
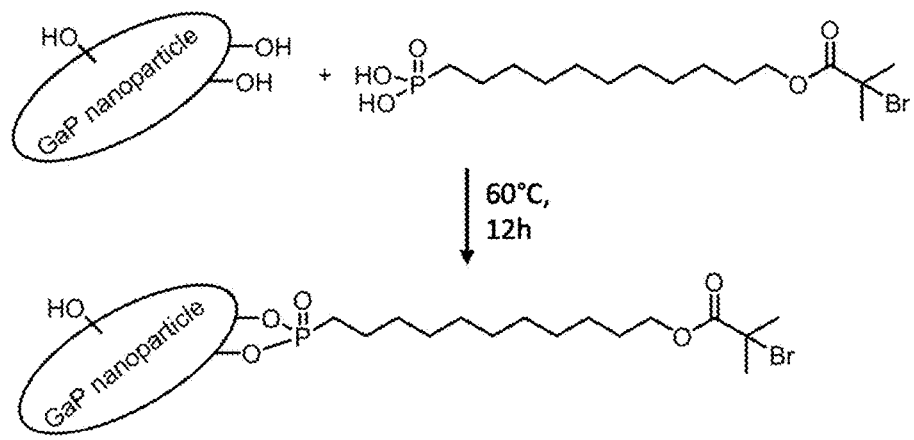
FIG. 6B illustrates the functionalization of oxidized GaP nanoparticle with a phosphonic-acid ligand, 11-(2-Bromoisobutyrate)-undecyl-1-phosphonic acid.

Example 2: Functionalization of GaP Nanoparticles by a Phosphonic Acid-Initiator Ligand A dispersion of GaP nanoparticles in dichloromethane (15 wt %, 10 mL) is refluxed at 60° C. with 0.5 g of phosphonic acid-functionalized ligand for 12 hrs. The phosphonic acid ligand can also be functionalized with a number of different coupling agents (including azides, alkynes, thiols, etc) or polymerization initiators (exemplary initiators are: for ATRP, a-bromoisobutyrates; for RAFT, di- or tri-thiocarbonates; for NMP, TEMPO derivatives). In this example, the ligand is 11-(2-Bromoisobutyrate)-undecyl-1-phosphonic acid. The mixture is allowed to cool to room temperature, and the nanoparticles are isolated by centrifugation and dispersed in fresh DCM. This process is repeated twice, and the isolated nanoparticles are dried in a vacuum oven at 60° C. for 2 hrs. FIG. 6B shows a diagram of the functionalization of the GaP nanoparticle. The nanoparticles are characterized by dynamic light scattering (DLS) and thermogravimetric analysis (TGA) to determine the efficiency of the ligand coupling reaction.

Figure 7:
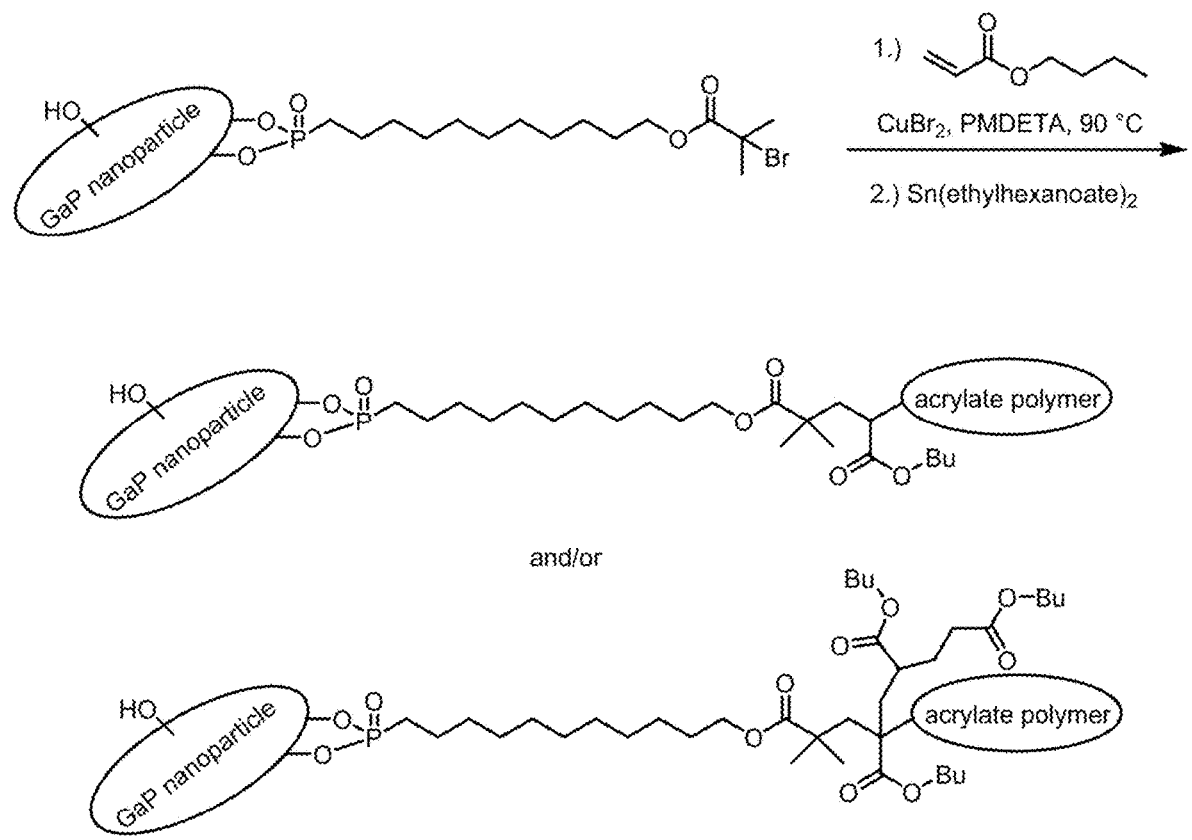
FIG. 7 illustrates the synthesis of poly(butyl acrylate)-functionalized GaP nanoparticles using the "grafting from" method of polymerization.

Example 3: Synthesis of Polymer-Functionalized GaP Nanoparticles by "Grafting-From" Method 1 gram of 11-(2-Bromoisobutyrate)-undecyl-1-phosphonic acid-functionalized GaP nanoparticles (synthesized in Example 2) are dispersed in 10 mL of toluene, with 2 grams of butyl acrylate, 15 mg of Cu(II) bromide, and 20 uL of Pentamethyldiethylenetriamine (PMDETA). The mixture is degassed with dry nitrogen for 20 mins, and placed in an oil bath at 90° C. Immediately, 25 uL of tin(II) ethylhexanoate is added, and the polymerization is allowed to proceed with vigorous stirring for 12 hours. The reaction is immediately cooled to 0° C. by placing the flask in an ice bath. Once cool, the copper catalyst is removed by filtering the mixture through an alumina plug. The poly(butyl acrylate)-functionalized GaP is precipitated in MeOH, isolated by centrifugation, and redissolved in tetrahydrofuran (TIF). This purification procedure is repeated twice, and the final GaP-polymer powder is isolated and dried in a vacuum oven at 60° C. for 2 hrs. FIG. 7 shows a diagram of the polymerization of the functionalized-GaP nanoparticle with butyl acrylate. "Bu" in the diagram indicates the butyl group.

Example 4: Formulation of Poly(Butyl Acrylate)-Functionalized GaP Nanoparticles in Acrylate Resin 150 mg of dry pBA-GaP (synthesized in Example 3) is added to 850 mg of acrylate oligomer dissolved in 8.5 g of propylene glycol monomethyl ether acetate (PGMEA) to make a 15 wt % dispersion of pBA-GaP in acrylate resin. The dispersion is sonicated to fully dissolve the pBA-GaP. Aggregation in the formulated resin is characterized by DLS.

What is claimed is:
1. An optical component comprising:
a substrate composed of a blended material comprising a first material that is doped with nanoparticles of Gallium based semiconductors, wherein the first material has a first refractive index that is lower than a second refractive index of the nanoparticles, and wherein the blended material is substantially transparent over at least a first band of light.
2. The optical component of claim 1, wherein the nanoparticles of Gallium based semiconductors are selected from a group consisting of: Gallium Phosphide, Gallium Sulfide, and Gallium Nitride.
3. The optical component of claim 1, wherein the nanoparticles of Gallium based semiconductor include a respective surface that comprises a first ligand comprising a functional group, wherein the first ligand is covalently coupled to the surface.
4. The optical component of claim 3, wherein the functional group is selected from a group consisting of: hydroxyl (—OH), carbonyl (—CO—), carboxyl (—COOH), amino (—NH$_2$), thiol (—SH), phosphate (—PO$_4^{-3}$), acrylate, epoxy, azide (—N$_3$), alkene (—C=C—), alkyne (—CCH), or halogen (—Br, —F, —I, —Cl) functional group.

5. The optical component of claim 3, wherein the first ligand is 11-(2-Bromoisobutyrate)-undecyl-1-phosphonate or 11-(2-Bromoisobutyrate)-undecyl-1-monophosphonate.

6. The optical component of claim 3, wherein the nanoparticles of Gallium based semiconductor further comprise a second ligand covalently coupled to the functional group.

7. The optical component of claim 6, wherein the second ligand is a small molecule, a monomer, or a polymer.

8. The optical component of claim 6, wherein the second ligand is at least one butyl acrylate monomer.

9. The optical component of claim 1, wherein the substrate is a waveguide body and the nanoparticles have a distribution within the waveguide body such that the waveguide body has an effective refractive index between the first refractive index and the second refractive index.

10. The optical component of claim 1, wherein the nanoparticles have a periodic distribution within a portion of the substrate, and the portion of the substrate is a diffraction grating.

11. The optical component of claim 1, wherein the second refractive index is at least 3 for the first band of light, and the first band of light is a visible band.

12. The optical component of claim 1, wherein the substrate is a polymer film.

13. The optical component of claim 1, wherein the substrate is a resin, wherein the resin comprises a crosslinking agent, a catalyst, and at least one monomer comprising at least one functional group, wherein the least one functional group is selected from the group consisting of: acrylate, epoxy, vinyl ether, thiol, or alkene, or a combination thereof.

14. The optical component of claim 1, wherein the first band of light is a visible band of light.

15. The optical component of claim 14, wherein the first band of light also includes a portion of an infrared band of light.

16. The optical component of claim 1, wherein the optical component is selected from a group consisting of: an optical film, a diffraction grating, a waveguide, a Fresnel lens, a positive lens, and a negative lens.

17. The optical component of claim 1, wherein the optical component is part of a near-eye display.

18. The optical component of claim 7, wherein the second ligand is the polymer.

* * * * *